United States Patent
Imamura

(10) Patent No.: US 10,305,993 B2
(45) Date of Patent: May 28, 2019

(54) TERMINAL CONTROL SYSTEM, METHOD FOR CONTROLLING TERMINAL, AND ELECTRONIC DEVICE

(71) Applicant: CASIO COMPUTER CO., LTD., Shibuya-ku, Tokyo (JP)

(72) Inventor: Keiichi Imamura, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 177 days.

(21) Appl. No.: 14/221,986

(22) Filed: Mar. 21, 2014

(65) Prior Publication Data

US 2014/0289356 A1    Sep. 25, 2014

(30) Foreign Application Priority Data

Mar. 22, 2013   (JP) .................. 2013-059743

(51) Int. Cl.
  *G06F 15/16*   (2006.01)
  *H04L 29/08*   (2006.01)
  (Continued)

(52) U.S. Cl.
  CPC ............ *H04L 67/125* (2013.01); *H04W 4/80* (2018.02); *G06F 3/167* (2013.01); *G10L 15/30* (2013.01)

(58) Field of Classification Search
  CPC .......... G06F 1/163; G06F 3/011; G06F 3/017; G06F 3/0346; G06F 3/038; G06F 3/167; H04L 67/125; H04W 4/008; G10L 15/30
  See application file for complete search history.

(56) References Cited

U.S. PATENT DOCUMENTS 6,496,695 B1   12/2002   Kurimura et al.
6,975,993 B1   12/2005   Keiller
(Continued)

FOREIGN PATENT DOCUMENTS

JP   2000048283 A   2/2000
JP   2001-014134 A   1/2001
(Continued)

OTHER PUBLICATIONS

Japanese Office Action (and English translation thereof) dated Jun. 9, 2015, issued in counterpart Japanese Application No. 2013-059743.

(Continued)

*Primary Examiner* — Moustafa M Meky
*Assistant Examiner* — Kidest Mendaye
(74) *Attorney, Agent, or Firm* — Holtz, Holtz & Volek PC

(57) ABSTRACT

There is provided a terminal control system including: a first terminal; a second terminal connected to the first terminal by short-distance wireless communication; and a server on a network connected to the second terminal via a communication link, in which the server includes: a storage unit which stores predetermined information to be detected by the first terminal and a sequence of processing commands to be executed by the second terminal in a manner such that the information and the processing commands are related to each other; and a terminal control unit sends the sequence of processing commands to the second terminal with reference to the storage unit so as to allow the second terminal to execute the processing commands in response to receiving the predetermined information from the first terminal via the second terminal.

13 Claims, 13 Drawing Sheets

(51) Int. Cl.
*H04W 4/80* (2018.01)
*G06F 3/16* (2006.01)
*G10L 15/30* (2013.01)

(56) References Cited

U.S. PATENT DOCUMENTS

| | | | |
|---|---|---|---|
| 7,099,825 B1* | 8/2006 | Cook | 379/202.01 |
| 8,014,761 B2 | 9/2011 | Kelly et al. | |
| 9,174,123 B2 | 11/2015 | Nasiri et al. | |
| 9,979,724 B2* | 5/2018 | Tunnell | H04W 4/70 |
| 2004/0054539 A1* | 3/2004 | Simpson | G10L 15/30 |
| | | | 704/270.1 |
| 2007/0273749 A1* | 11/2007 | Fujii | H04M 1/72522 |
| | | | 348/14.01 |
| 2009/0253463 A1* | 10/2009 | Shin | H04M 1/72583 |
| | | | 455/563 |
| 2010/0088100 A1* | 4/2010 | Lindahl | G10L 15/30 |
| | | | 704/270.1 |
| 2010/0124949 A1* | 5/2010 | Demuynck | G06F 1/1626 |
| | | | 455/569.1 |
| 2010/0263015 A1* | 10/2010 | Pandey | H04N 21/42203 |
| | | | 725/153 |
| 2011/0022196 A1* | 1/2011 | Linsky | G06F 1/163 |
| | | | 700/85 |
| 2011/0059769 A1* | 3/2011 | Brunolli | G08C 17/02 |
| | | | 455/556.1 |
| 2011/0096174 A1* | 4/2011 | King | G06F 21/31 |
| | | | 348/207.1 |
| 2012/0197523 A1* | 8/2012 | Kirsch | G01C 21/362 |
| | | | 701/426 |
| 2013/0069985 A1* | 3/2013 | Wong | G02B 27/017 |
| | | | 345/633 |
| 2013/0285836 A1* | 10/2013 | Proud | H01F 38/14 |
| | | | 340/870.02 |
| 2013/0342457 A1* | 12/2013 | Cox | H05K 7/14 |
| | | | 345/158 |
| 2014/0028539 A1* | 1/2014 | Newham | G06F 1/1694 |
| | | | 345/156 |
| 2014/0249817 A1* | 9/2014 | Hart | G10L 15/22 |
| | | | 704/239 |
| 2014/0281946 A1* | 9/2014 | Avni | G06T 1/0021 |
| | | | 715/268 |
| 2016/0018902 A1 | 1/2016 | Nasiri et al. | |

FOREIGN PATENT DOCUMENTS

| | | |
|---|---|---|
| JP | 2006510965 A | 3/2006 |
| JP | 2009118474 A | 5/2009 |
| JP | 2009-244432 A | 10/2009 |
| JP | 2010245668 A | 10/2010 |
| JP | 2012249334 A | 12/2012 |
| JP | 2013510381 A | 3/2013 |

OTHER PUBLICATIONS

Japanese Office Action (and English translation thereof) dated Dec. 1, 2015, issued in counterpart Japanese Application No. 2013-059743.

Japanese Office Action (and English translation thereof) dated Mar. 14, 2017, issued in counterpart Japanese Application No. 2016-037081.

* cited by examiner

FIG. 10

MACRO-EXECUTION LIST  52

| VOICE | COOPERATIVE APPLICATIONS | SMARTPHONE PROCESSING |
|---|---|---|
| "I AM COMING COME NOW, SMARTPHONE" | SYSTEM | RESTORE SMARTPHONE FROM SLEEP |
| | ELECTRONIC MAIL | START |
| | ELECTRONIC MAIL | SELECT "YAMADA HANAKO" AS ADDRESS TO BE INPUT |
| | ELECTRONIC MAIL | INPUT SENTENCE "I HAVE JUST LEFT HOME" |
| | ELECTRONIC MAIL | EXECUTE SENDING |
| "NEXT TRAIN FROM THE OFFICE, SMARTPHONE" | SYSTEM | RESTORE SMARTPHONE FROM SLEEP |
| | TRAFFIC GUIDE | START |
| | TRAFFIC GUIDE | SELECT "TRANSFER GUIDE" |
| | TRAFFIC GUIDE | INPUT "HATSUDAI" AS DEPARTURE STATION |
| | TRAFFIC GUIDE | INPUT "WASHINOMIYA" AS DESTINATION STATION |
| | TRAFFIC GUIDE | SPECIFY TIME FIVE MINUTES AFTER CURRENT TIME AS TIME OF DEPARTURE |
| | TRAFFIC GUIDE | EXECUTE SEARCHING |
| . . . | | |

FIG. 16

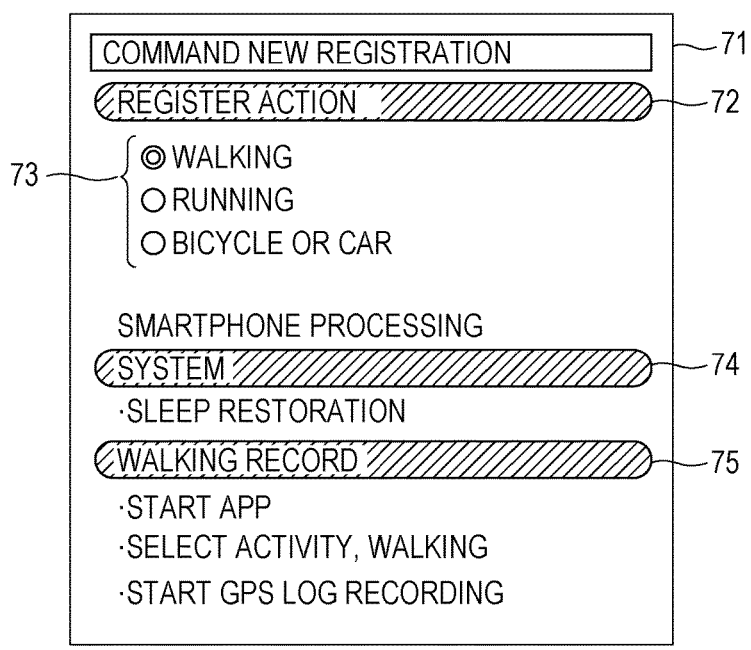

```
┌─────────────────────────────────────┐
│  ┌─────────────────────────────┐    │
│  │ COMMAND NEW REGISTRATION    │──71│
│  ├─────────────────────────────┤    │
│  │░REGISTER ACTION░░░░░░░░░░░░░│──72│
│  └─────────────────────────────┘    │
│     ⎧ ◉ WALKING                     │
│  73─⎨ ○ RUNNING                     │
│     ⎩ ○ BICYCLE OR CAR              │
│                                     │
│     SMARTPHONE PROCESSING           │
│  ┌─────────────────────────────┐    │
│  │░SYSTEM░░░░░░░░░░░░░░░░░░░░░░│──74│
│  └─────────────────────────────┘    │
│     ·SLEEP RESTORATION              │
│  ┌─────────────────────────────┐    │
│  │░WALKING RECORD░░░░░░░░░░░░░░│──75│
│  └─────────────────────────────┘    │
│     ·START APP                      │
│     ·SELECT ACTIVITY, WALKING       │
│     ·START GPS LOG RECORDING        │
└─────────────────────────────────────┘
```

FIG. 17

MACRO-EXECUTION LIST    81

| OPERATION | COOPERATIVE APPLICATIONS | SMARTPHONE PROCESSING |
|---|---|---|
| WALKING | SYSTEM | RESTORE SMARTPHONE FROM SLEEP |
| | WALKING RECORD | START |
| | WALKING RECORD | SELECT "WALKING RECORD" |
| | WALKING RECORD | START GPS LOG RECORDING |

TERMINAL CONTROL SYSTEM, METHOD FOR CONTROLLING TERMINAL, AND ELECTRONIC DEVICE

BACKGROUND

1. Technical Field

The present invention relates to a terminal control system that remote-controls a multi-functional mobile terminal, a method for controlling a terminal, and an electronic device used for the system.

2. Related Art

In recent years, more and more people have been using multi-functional mobile terminals as typified by smartphones (multi-functional cellular phone units). The mobile terminals of this type are equipped with not only an electronic-mail function and a call function but also an Internet function, a photo-taking function, a PIM (Personal Information Manager) function, and so forth. In order for us to use the above functions, we have to do complicated operations including turning on a mobile terminal, starting application software (hereinafter referred to as app as appropriate) that we want, and then inputting required items in accordance with predetermined procedures.

In the meanwhile, as voice recognition techniques have been dramatically developed, systems for inputting instructions by voice have been examined in various manners. Specifically, JP2001-14134 A discloses a system in which a user uses commands that he/she says out aloud in order to control the operations or the functions of a device connected to a network. JP 2009-244432 A discloses a system in which a user sends his/her voice from a mobile terminal to a voice recognition server and uses the result of recognition for application software.

As described above, recent mobile terminals are equipped with various functions, which take users complicated operations to use. The operations are so annoying especially for users who are not used to the operations that the users are not always capable of using the mobile terminals efficiently enough in their daily life.

Further, mobile terminals may be operated using the voice recognition techniques disclosed in the above publications, for example. The operation using the techniques, however, disadvantageously requires us to do a series of actions, such as taking out mobile terminals and performing predetermined procedures, every time we intend to operate the mobile terminals, and this necessity leads to lack of promptness of usage. Moreover, the voice recognition techniques are only applicable to limited functions and functions cannot be expanded.

The present invention has been made in view of the above disadvantages, and an object of the present invention is to provide a terminal control system that enables us to easily start and use various functions of mobile terminals without the need for troublesome operations, a method for controlling a terminal, and an electronic device used for the system.

SUMMARY

A terminal control system according to the present invention includes: a first terminal; a second terminal connected to the first terminal by short-distance wireless communication; and a server on a network connected to the second terminal via a communication link, in which the server includes: a storage unit which stores predetermined information to be detected by the first terminal and a sequence of processing commands to be executed by the second terminal in a manner such that the information and the commands are related to each other; and a terminal control unit which sends the sequence of processing commands to the second terminal with reference to the storage unit so as to allow the second terminal to execute the processing commands in response to receiving the predetermined information from the first terminal via the second terminal.

According to the present invention, remote control of a terminal is enabled by using as a trigger predetermined information detected by a terminal different from the above terminal. With this technique, various functions of mobile terminals can be easily started and used for various cases without the need of doing complicated operations.

BRIEF DESCRIPTION OF THE DRAWINGS

FIG. 10 is a drawing illustrating an example of a macro-execution list, which is a list of macro-execution data in the first embodiment;

FIG. 16 is a drawing illustrating a configuration of a command registration screen according to a second embodiment of the present invention;

FIG. 17 is a drawing illustrating an example of a macro-execution list, which is a list of macro-execution data in the second embodiment;

DETAILED DESCRIPTION

Embodiments of the present invention will be hereinafter described with reference to accompanying drawings.

First Embodiment

Figure 1:
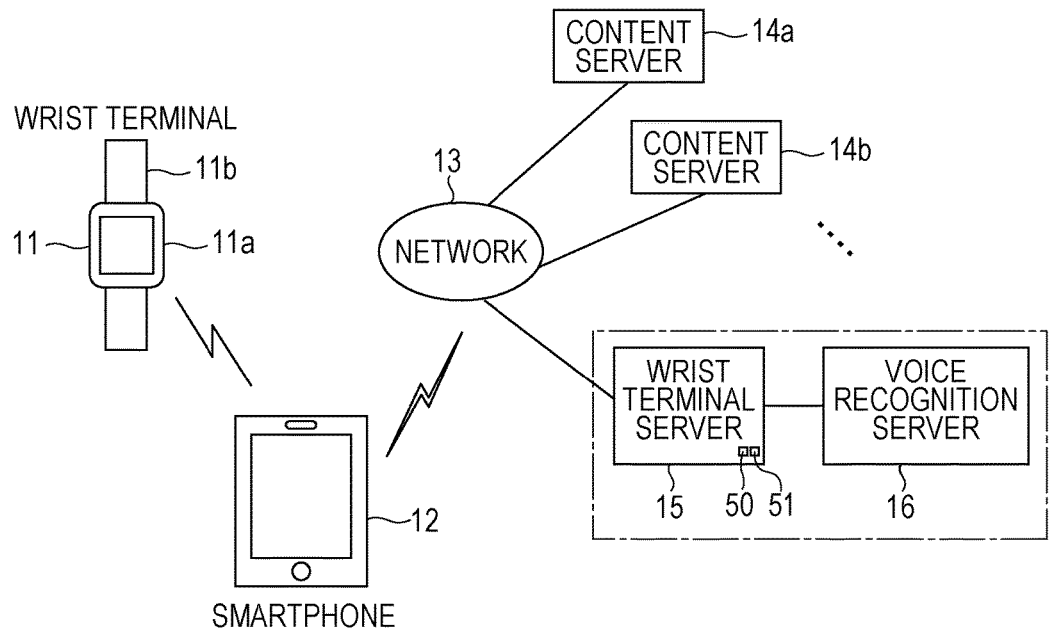
FIG. 1 is a drawing illustrating a configuration of a terminal control system according to a first embodiment of the present invention.

FIG. 1 is a drawing illustrating a configuration of a terminal control system according to a first embodiment of the present invention.

The system includes a wrist terminal 11, a smartphone 12, and various types of content servers 14a, 14b, (the rest is omitted), a wrist terminal server 15, and a voice recognition server 16, the servers 14, 15, and 16 being on a network 13 such as the Internet.

The wrist terminal 11 corresponds to a first terminal of the present invention. In this embodiment, the wrist terminal 11 is a body-worn electronic device and is in the shape of a watch so as to be attached to a wrist of a user. Further, the wrist terminal 11 includes a device body 11a and a band 11b attached to each side of the device body 11a. As described later, the device body 11a of the wrist terminal 11 includes motion detection sensors such as an acceleration sensor and an angular rate sensor.

On the other hand, the smartphone 12 corresponds to a second terminal of the present invention and is a mobile communication terminal device more sophisticated than the wrist terminal 11, which is the first terminal. When the smartphone 12 is in the proximity of the wrist terminal 11, the wrist terminal 11 and the smartphone 12 are connected together for communication by short-distance wireless communication such as Bluetooth (registered trade mark).

Further, the smartphone 12 has a function of making communication-connection to the content servers 14a, 14b, (the rest is omitted) and the wrist terminal server 15 on the network 13 via wireless LAN (Wi-Fi) or a 3G cellular phone network, for example.

The content servers 14a, 14b, (omitted) offer various services on the network 13, including distributing whether information on various areas, music, and movies. The wrist terminal server 15 is a dedicated server for managing the wrist terminal 11 and includes a server memory 51 and a terminal control section 50.

The server memory 51 stores predetermined information to be detected by the wrist terminal 11 (first terminal) and a sequence of processing commands to be executed by the smartphone 12 (second terminal) in a manner such that the information and the commands are related to each other. The "predetermined information" means voice or an action of a user as described later. Upon receipt of the predetermined information from the wrist terminal 11 via the smartphone 12, the terminal control section 50 sends the sequence of processing commands to the smartphone 12 with reference to the server memory 51 so as to allow the smartphone 12 to execute the processing commands.

The voice recognition server 16 is a dedicated server for performing recognition processing on voice information and is connected to the wrist terminal server 15. Note that although the wrist terminal server 15 and the voice recognition server 16 are separately provided in the example shown in FIG. 1, the wrist terminal server 15 may additionally function as the voice recognition server 16.

The following is the description of how the wrist terminal 11 is used in the system.

Figure 2:
FIG. 2 is a drawing illustrating a state in which a wrist terminal according to the first embodiment is attached to a wrist of a user.
Figure 3:
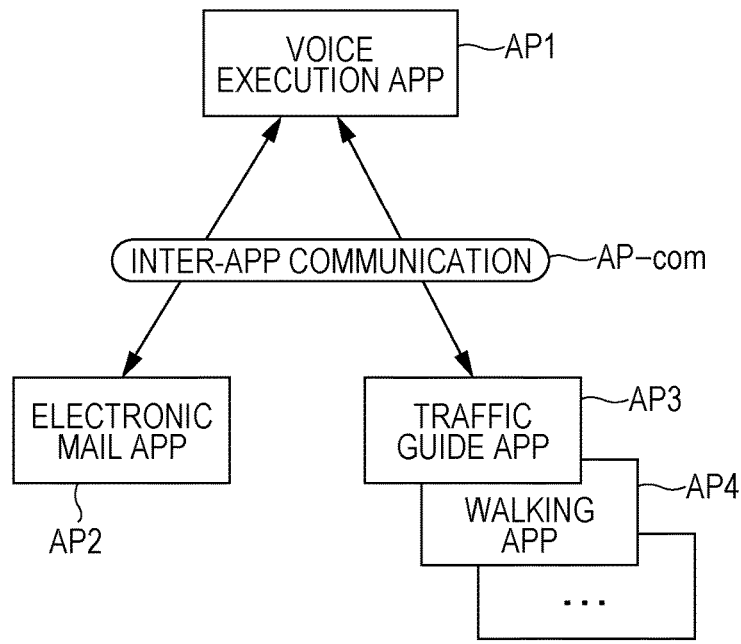
FIG. 3 is a drawing illustrating a principle of a communication between different applications software according to the first embodiment.

FIG. 2 is a drawing illustrating a state in which the wrist terminal 11 according to the system is attached to a wrist of a user. FIG. 3 is a drawing illustrating a principle of a communication between different applications software.

In the system, a user speaks aloud to the wrist terminal 11 in order to remote-control the smartphone 12. In the example of FIG. 2, a user is saying aloud, "I am coming home now, Smartphone" to the wrist terminal 11.

As shown in FIG. 3, the voice let out by a user is delivered into the wrist terminal 11 via a microphone installed in the wrist terminal 11, is output from the wrist terminal 11 to the smartphone 12, and is received by voice execution application software AP1. The voice execution application software AP1 interprets the voice as a command, with a reserved word of "Smartphone" as a trigger. In accordance with the voice interpreted as a command, various types of applications software AP2, AP3, AP4, (the rest is omitted) are executed via communication AP-com between applications software.

More specifically, the voice interpreted as a command is sent to the wrist terminal server 15 via the smartphone 12 in the form of voice data, and thereafter is subjected to voice recognition by the voice recognition server 16 connected to the wrist terminal server 15. As described later, in the wrist terminal server 15, applications software that the smartphone 12 executes in response to input voice and the processing contents of the applications software are registered. The wrist terminal server 15 receives the result of voice recognition from the voice recognition server 16 and then instructs the smartphone 12 to execute appropriate application software.

Figure 4:
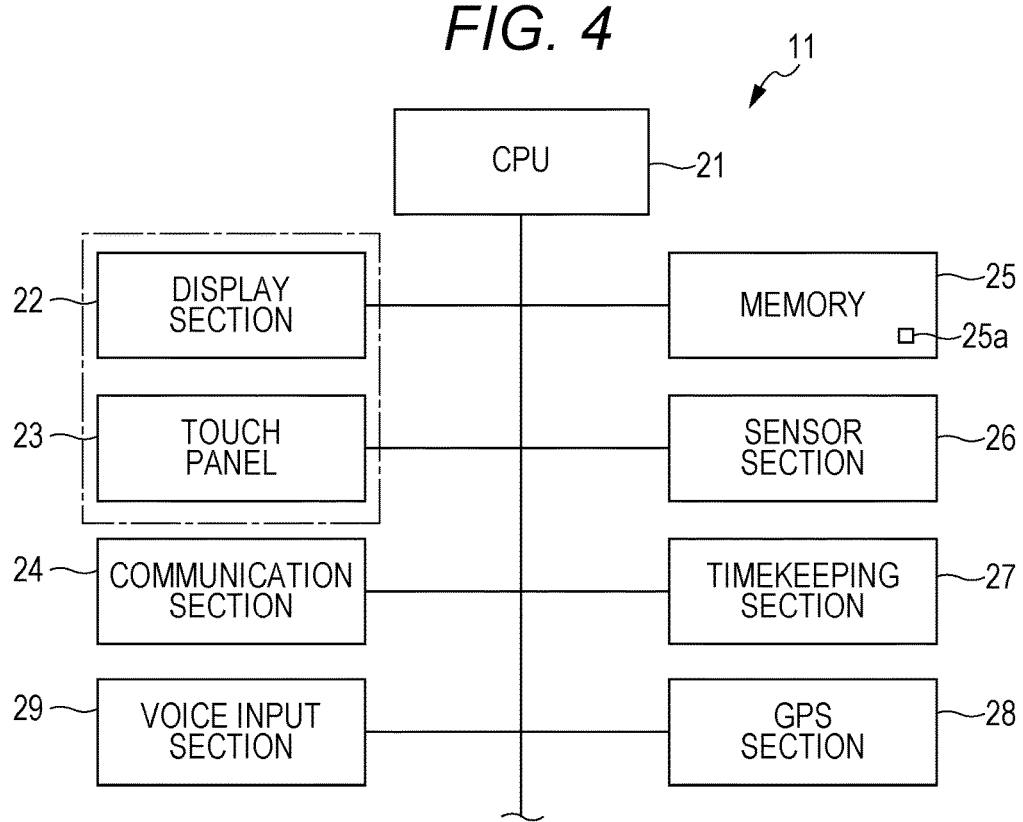
FIG. 4 is a block diagram illustrating a circuit configuration of the wrist terminal according to the first embodiment.

The following is detailed descriptions of the configuration and the operation of each part. FIG. 4 is a block diagram illustrating a circuit configuration of the wrist terminal 11.

The wrist terminal 11 includes a CPU 21, a display section 22, a touch panel 23, a communication section 24, a memory 25, a sensor section 26, a timekeeping section 27, a GPS section 28, and a voice input section 29.

The CPU 21 controls the operations of the wrist terminal 11 by starting a program 25a stored in the memory 25.

The display section 22 is formed of a LCD (liquid crystal display) and color-displays various types of information. The touch panel 23 is placed on a display screen of the display section 22 and is used for performing input instructions by a touching operation. The display section 22 and the touch panel 23 form an integrated input display unit. With this unit, a user can perform input instructions by a touching operation while watching the display of the screen.

The communication section 24 transmits/receives data to/from an external terminal (the smartphone 12 in this example), respectively, by short-distance wireless communication such as Bluetooth (registered trade mark).

The memory 25 stores not only the program 25a for controlling the CPU 21 but also various data necessary for the processing operations of the CPU 21.

The sensor section 26 has motion detection sensors including a triaxial acceleration sensor capable of detecting respective accelerations in x, y, and z-axial directions and a gyroscope. The timekeeping section 27 is a section for carrying out a timekeeping function of the wrist terminal 11 and indicates a current time. Further, the GPS section 28 detects an actual location by a GPS (global positioning system). The voice input section 29 includes a microphone and inputs voices let out by a user.

Figure 5:
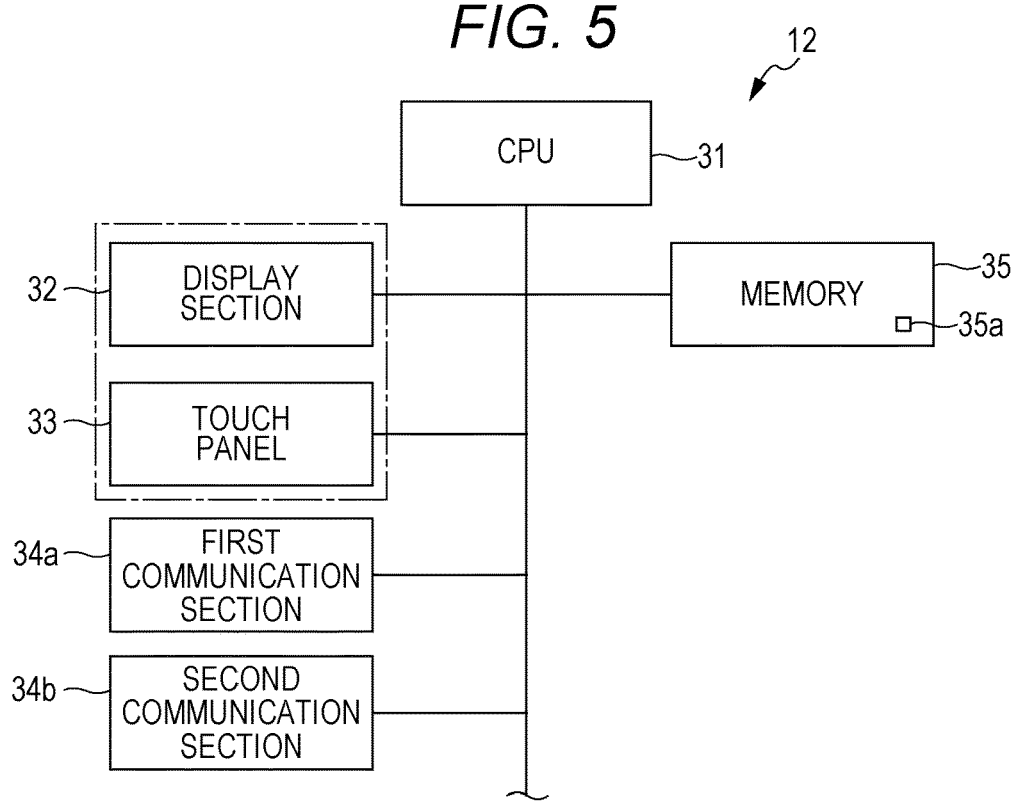
FIG. 5 is a block diagram illustrating a circuit configuration of a smartphone according to the first embodiment.

FIG. 5 is a block diagram illustrating a circuit configuration of the smartphone 12.

The smartphone 12 includes a CPU 31, a display section 32, a touch panel 33, a first communication section 34a, a second communication section 34b, and a memory 35.

The CPU 31 controls the operations of the smartphone 12 by starting a program 35a stored in the memory 35.

As with the display section 22 and the touch panel 23 of the wrist terminal 11, the display section 32 and the touch panel 33 form an integrated input display unit. With this unit, a user can perform input instructions by a touching operation while watching the display of the screen.

The first communication section 34a transmits/receives data to/from an external terminal (the wrist terminal 11), respectively, by wireless communication with a short-distance communication function such as Bluetooth (registered trade mark). The second communication section 34b accesses the content servers 14a, 14b, etc. and the wrist terminal server 15 on the network 13 via wireless LAN (Wi-Fi) or a 3G cellular phone network, for example.

The memory 35 stores not only the program 35a for controlling the CPU 31 but also various data necessary for processing operations of the CPU 31. In the meanwhile, the descriptions of the acceleration sensor, the GPS function, etc. that the smartphone 12 has as the wrist terminal 11 has will be omitted because they have no direct connection with the gist of the present invention.

Further, each of the content servers 14a, 14b, etc., the wrist terminal server 15, and the voice recognition server 16 is formed of a general computer having a CPU, a ROM, a RAM, for example, and will not be specifically described with reference to the drawings.

Subsequently, the operations of the terminal control system according to the first embodiment will be described by dividing the operations into the operations at the times of (a) command registration and (b) application software execution.

(a) Operations at the Time of Command Registration

Figure 6:
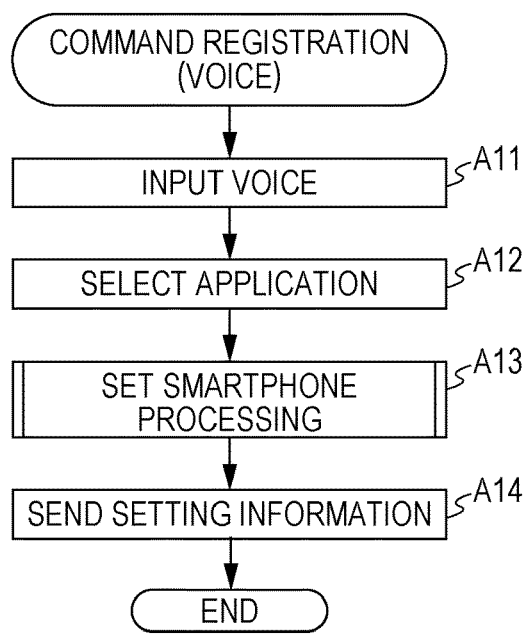
FIG. 6 is a flowchart illustrating processing operations at the time of command registration conducted by the smartphone according to the first embodiment.

FIG. 6 is a flowchart illustrating processing operations at the time of command registration conducted by the smartphone 12 according to the system. The processing shown in the flowchart is executed in a manner that the CPU 31 installed in the smartphone 12 reads the program 35a stored in the memory 35.

Figure 8:
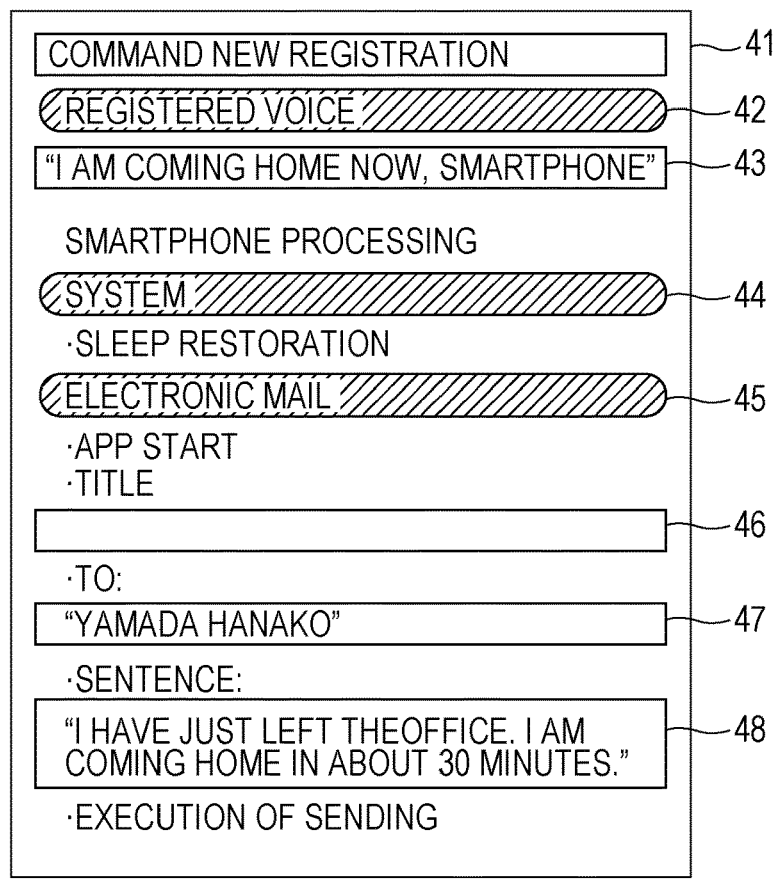
FIG. 8 is a drawing illustrating an example of a command registration screen displayed on the smartphone according to the first embodiment.

The "command registration" means doing settings for allowing the smartphone 12 to execute applications. More specifically, it means adequately setting voices as triggers of execution of applications software, applications to be executed, and processing contents via a command registration screen 41 as shown in FIG. 8. The command registration screen 41 is provided by the wrist terminal server 15 and can be obtained via Web application software.

First, a user inputs voice serving as a trigger of execution of application software via the command registration screen 41 by predetermined operations (Step A11). More specifically, the user says aloud key words for registration while pressing a voice registration button 42 on the command registration screen 41. The voice let out at this time is given from the smartphone 12 to the wrist terminal server 15 via the network 13. The wrist terminal server 15 performs voice recognition via the voice recognition server 16 and displays the result of the recognition on a voice setting section 43 on the command registration screen 41. The recognition result displayed on the voice setting section 43 may be adequately modified by doing a button operation on the smartphone 12.

FIG. 8 shows an example in which the voice message "I am coming home now, Smartphone" has been registered. Although the voice that a user has actually let out is registered in this example, the voice registration may be conducted in a manner that text data of voice is directly input into the voice setting section 43 by a button operation conducted on the smartphone 12.

Thereafter, the user sets an application and smartphone processing by predetermined operations (Steps A12 and A13). Specifically, the user inputs an application and processing contents by pressing app selection buttons 44 and 45 on the command registration screen 41.

In the example of FIG. 8, with the app selection button 44, "System" Application is registered and "sleep restoration" is registered as the processing contents. Furthermore, with the app selection button 45, "Electronic Mail" Application is registered, and sending mails set in a title setting section 46, an address setting section 47, and a message setting section 48 is registered as the processing contents. Data for the title setting section 46, the address setting section 47, and the message setting section 48 is directly input by a button operation of the smartphone 12.

The setting of the processing executed by the smartphone in Step A13 mentioned above will be described with reference to a case of setting electronic mail processing.

Figure 7:
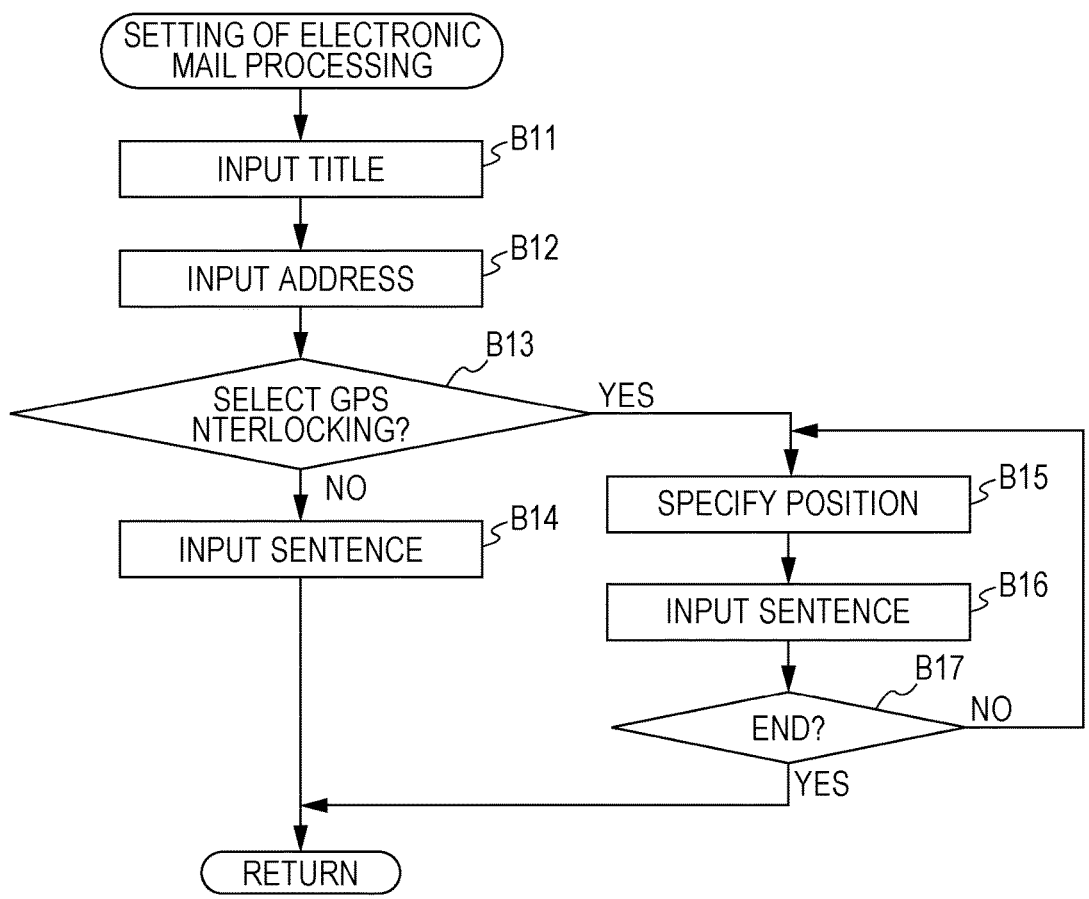
FIG. 7 is a flowchart illustrating setting operations of electronic-mail processing by the smartphone according to the first embodiment.

FIG. 7 is a flowchart illustrating setting operations of electronic mail processing.

First, a user inputs data on a title and an address by predetermined operations (Steps B11 and B12). Specifically, the user inputs data into the title setting section 46, the address setting section 47, and the message setting section 48 on the command registration screen 41. Note that data input into the title setting section 46 is optional.

Subsequently, a pop-up screen not shown in the drawings appears on the command registration screen 41, and the presence or absence of "GPS interlocking" is inquired (Step B13).

The "GPS interlocking" is a function capable of setting different messages for the same voice according to positions by specifying arbitrary positions on a map. For example, if the user has specified a place where he/she is going to on a map, the user can send a message containing, for example, the time to come home from the place separately from the message to be sent when the user is coming home from his/her office.

If the user does not select the "GPS interlocking" ("No" in Step B13), the user inputs data on the message setting section 48 by predetermined operations and ends the processing (Step B14). On the other hand, if the user selects the "GPS interlocking" ("Yes" in Step B13), the user specifies a position on a map not shown in the drawings by predetermined operations (Step B15) and inputs the data on the message setting section 48 (Step B16). The user may specify more than one position. In that case, after inputting message data for the positions, respectively, the user ends the processing (Step B17).

After the voice, the applications, and the processing contents have been set on the command registration screen 41 as described above, the smartphone 12 (specifically CPU 31) adds a wrist terminal ID and a user ID to the setting information and sends all of the IDs and the information to the wrist terminal server 15 (Step A14).

Figure 9:
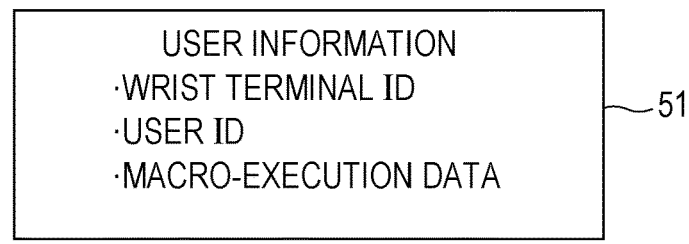
FIG. 9 is a drawing illustrating an example of a server memory provided in a wrist terminal server according to the first embodiment.

As shown in FIG. 9, the wrist terminal server 15 has the high-capacity server memory 51. The server memory 51 stores a wrist terminal ID, a user ID, and macro-execution data based on the setting information for each user.

The "wrist terminal ID" is an identification number assigned to the wrist terminal 11 of the user. The "user ID" is a user's specific identification number. The "macro-execution data" is data for allowing the smartphone 12 to execute applications and is formed of the voice, the applications, and the processing contents set on the command registration screen 41.

FIG. 10 is a drawing illustrating an example of a macro-execution list 52, which is a list of the macro-execution data.

In this example, a user has registered the message "I am coming home now, Smartphone" with his/her voice, and the procedures are registered of starting "System" and "Electronic Mail" Applications of the smartphone 12 upon receipt of input of the message and thereafter executing processing regarding electronic mails. In another example, "next train from the office, Smartphone" is registered with the user's voice, and procedures are registered of starting "System" and "Traffic Guide" Applications of the smartphone 12 and executing processing regarding a traffic guide. If voice of a person who is not the person having registered the voice is input, an error indicating a failure of voice recognition is output.

(b) Operations at the Time of Execution of Application Software

As shown in FIG. 2, a user of the system is always wearing the wrist terminal 11 on a wrist. The smartphone 12 is supposed to be within a range where short-distance wireless communication is possible between the smartphone 12 and the wrist terminal 11 (on the clothes or in the bag of the user, for example).

(Processing by the Wrist Terminal)

Figure 11:
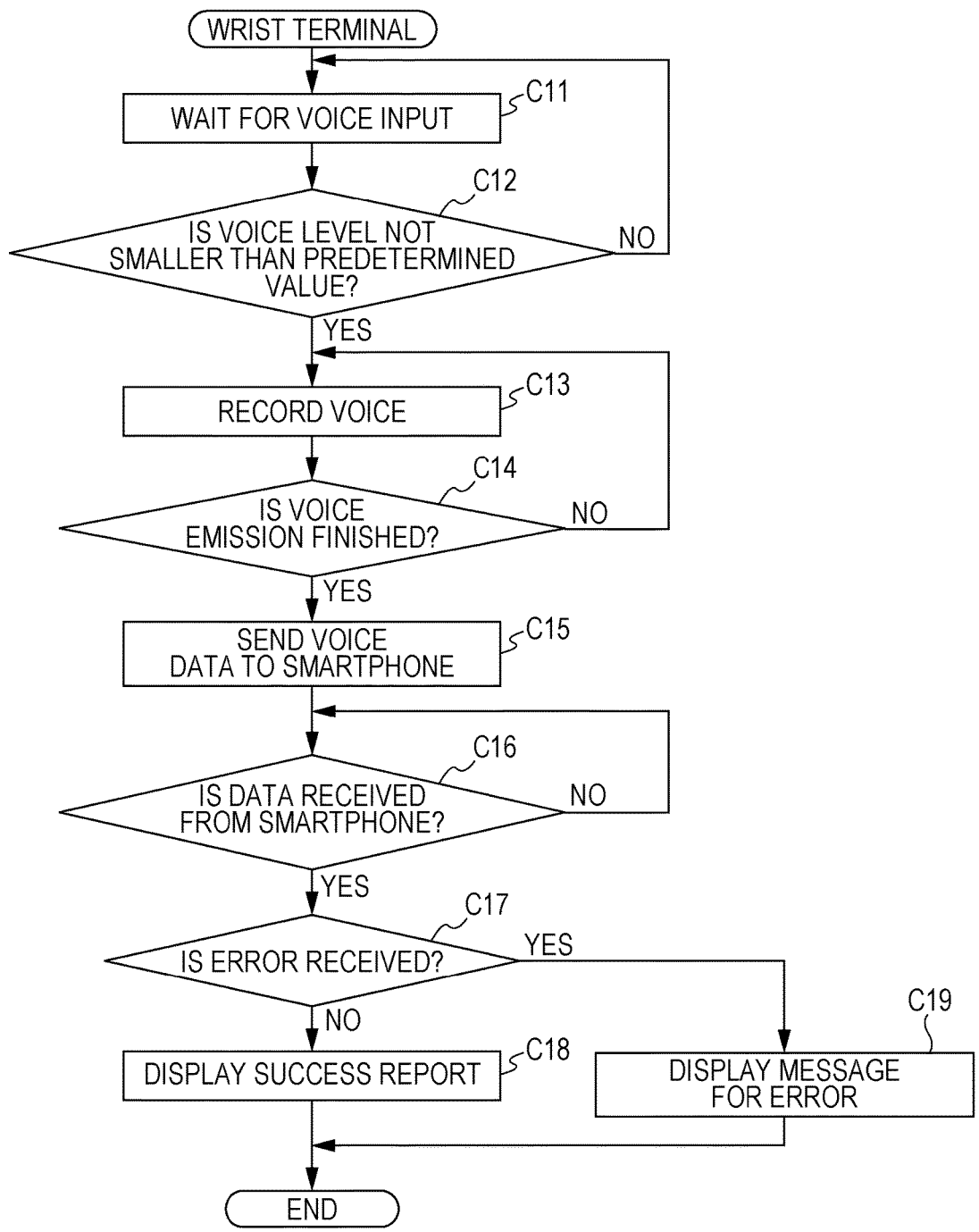
FIG. 11 is a flowchart illustrating processing at the time of execution of application software conducted by the wrist terminal according to the first embodiment.

FIG. 11 is a flowchart illustrating the processing at the time of execution of application software conducted by the wrist terminal 11 according to the system. The processing shown in the flowchart is executed in a manner that the CPU 21 installed in the wrist terminal 11 reads the program 25a stored in the memory 25.

A case will be described next where a user has just spoken to the wrist terminal 11. The voice data of the user is input through the voice input section 29 of the smartphone 12. When the wrist terminal 11 (actually CPU 21) receives not smaller than a predetermined amount of voice data ("Yes" in Steps C11 and C12), it stores the input voice data into a predetermined area of the memory 25, for example (Step C13). The voice data is continually stored until the user finishes emitting the voice ("No" in Step C14→C13).

When the voice emission is finished ("Yes" in Step C14), the wrist terminal 11 sends the voice data recorded in the predetermined area of the memory 25 to the smartphone 12 (Step C15) and waits for the result of execution performed on the voice data by the smartphone 12 (Step C16).

After sending the voice data, the wrist terminal 11 displays a success report, if having received the report as the execution result from the smartphone 12 ("No" in Step C17), on the display section 22 of the wrist terminal 11 (Step C18).

On the other hand, the wrist terminal 11 displays a message for an execution error, if having received a notification of the execution error from the smartphone 12 ("Yes" in Step C17), on the display section 22 of the wrist terminal 11 (Step C19).

(Processing by the Smartphone)

Figure 12:
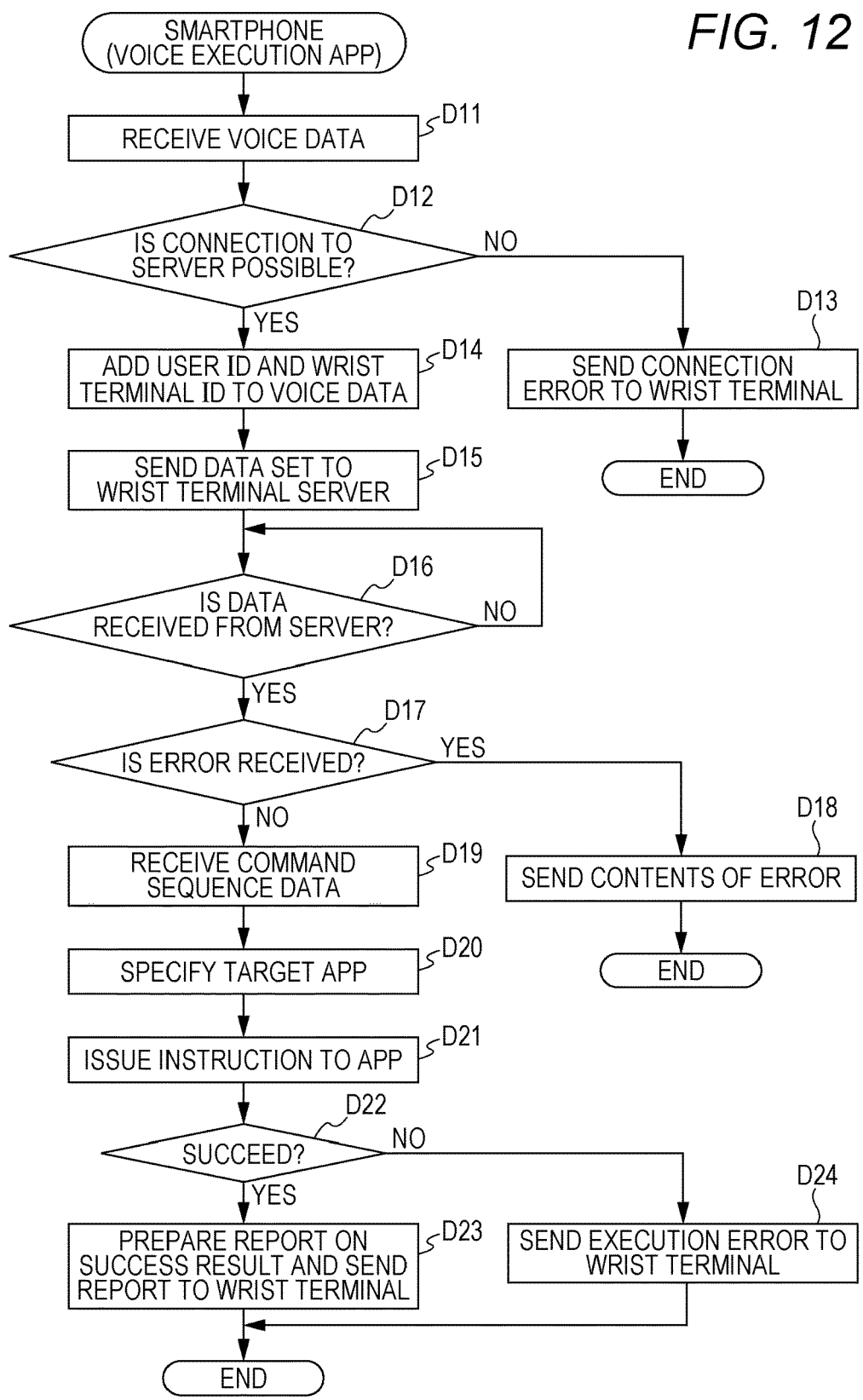
FIG. 12 is a flowchart illustrating processing at the time of execution of application software conducted by the smartphone according to the first embodiment.

FIG. 12 is a flowchart illustrating the processing at the time of execution of application software conducted by the smartphone 12 according to the system. The processing shown in the flowchart is executed in a manner that the CPU 31 installed in the smartphone 12 reads the program 35a (voice execution application software AP1) stored in the memory 35.

If the wrist terminal 11 has sent voice data of a user to the smartphone 12 in Step C15 of FIG. 11, the smartphone 12 (actually CPU 31) receives the voice data (Step D11) and determines whether a connection is possible between the smartphone 12 and the wrist terminal server 15 on the network 13 (Step D12).

As a means for connecting to the wrist terminal server 15 on the network 13, wireless LAN (Wi-Fi) or a 3G cellular phone network, for example is used. If a connection is impossible to the wrist terminal server 15 using the above connection means ("No" in Step D12), the smartphone 12 notifies the wrist terminal 11 of a connection error (Step D13). Upon receipt of the notification of the connection error, the wrist terminal 11 displays a message indicative of the connection error on the display section 22 (see Step C19 in FIG. 11).

If a connection is possible to the wrist terminal server 15 ("Yes" in Step D12), the smartphone 12 adds a wrist terminal ID and a user ID to the voice data of the user and sends all of the IDs and the data to the wrist terminal server 15 (Step D14 and D15).

The wrist terminal server 15 responds to the transmission of the data set (the voice data, the user ID, and the wrist terminal ID) ("Yes" in Step D16). If the response is an error notification ("Yes" in Step D17), the smartphone 12 sends the contents of the error notification to the wrist terminal 11 (Step D18). Upon receipt of the contents of the error notification, the wrist terminal 11 displays a message indicative of the contents on the display section 22 (see Step C19 in FIG. 11).

If the response is not an error notification ("No" in Step D17), the smartphone 12 receives command sequence data sent from the wrist terminal server 15 (Step D19). The smartphone 12 specifies target application software based on the command sequence data (Step D20), starts the target application software, and executes predetermined processing (Step D21).

If the smartphone 12 has succeeded in the processing with the target application software ("Yes" in Step D22), the smartphone 12 prepares a report on the success result and sends the report to the wrist terminal 11 (Step D23). Upon receipt of the success report, the wrist terminal 11 displays the success report on the display section 22 (see Step C18 in FIG. 11). If the smartphone 12 has failed in the processing with the target application software ("No" in Step D22), it notifies the wrist terminal 11 of an execution error (Step D24). Upon receipt of this notification, the wrist terminal 11 displays the execution error on the display section 22 (see Step C19 in FIG. 11).

(Processing by the Wrist Terminal Server)

Figure 13:
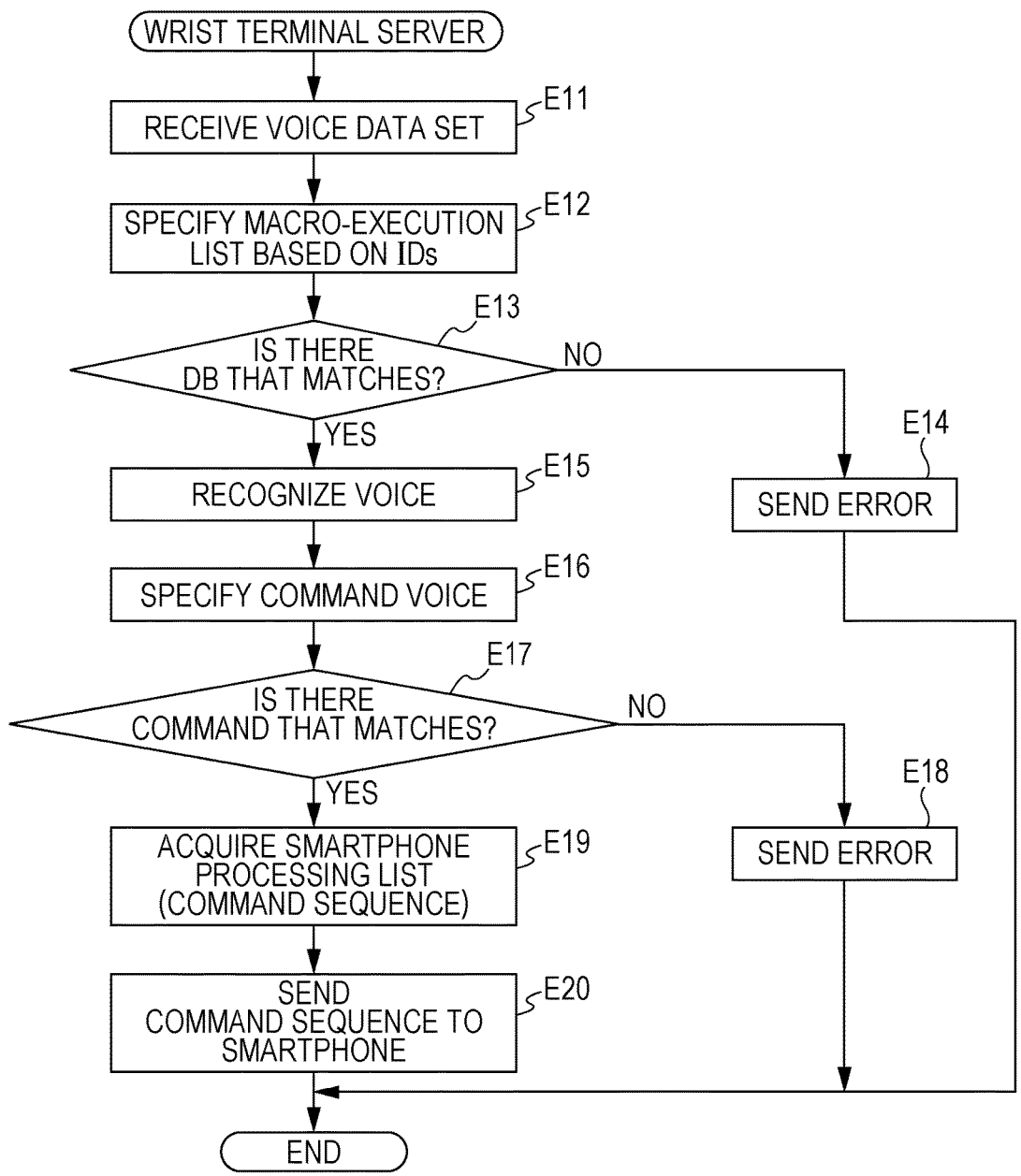
FIG. 13 is a flowchart illustrating processing at the time of execution of application software conducted by the wrist terminal server according to the first embodiment.

FIG. 13 is a flowchart illustrating processing at the time of execution of application software conducted by the wrist terminal server 15 according to the system. The processing shown in the flowchart is executed in a manner that a CPU (not shown in the drawings) installed in the wrist terminal server 15 reads a predetermined program.

If the smartphone 12 has sent voice data set (voice data, a user ID, and a wrist terminal ID) to the wrist terminal server 15 in Step D15 of FIG. 12, the wrist terminal server 15 (actually the CPU in the wrist terminal server 15)

receives the voice data set (Step E11) and specifies the macro-execution list 52 based on the user ID and the wrist terminal ID included in the voice data set (Step E12).

If the specified macro-execution list 52 is not stored in the server memory 51 ("No" in Step E13), the wrist terminal server 15 sends an error notification to the smartphone 12 (Step E14). Upon receipt of the error notification from the wrist terminal server 15, the smartphone 12 sends the contents of the error notification to the wrist terminal 11 (Step D17 and D18 of FIG. 12).

If the specified macro-execution list 52 is stored in the server memory 51 ("Yes" in Step E13), the wrist terminal server 15 sends the voice data included in the voice data set to the voice recognition server 16 so as to allow the voice data to be subjected to voice recognition, and obtains a voice text as the result of the recognition (Step E15). The wrist terminal server 15 specifies a command based on the voice text (Step E16). The voice recognition server 16 determines using, for example, a voice signature whether or not the input voice is the same as the voice that a user has registered. If a person who is not the user inputs his/her voice, an error indicating a failure of voice recognition is output.

If the specified command is not in the macro-execution list 52 ("No" in Step E17), the wrist terminal server 15 sends an error notification to the smartphone 12 (Step E18). Upon receipt of the error notification from the wrist terminal server 15, the smartphone 12 sends the contents of the error notification to the wrist terminal 11 (see Steps D17 and D18 in FIG. 12).

If the specified command is in the macro-execution list 52 ("Yes" in Step E17), the wrist terminal server 15 acquires a smartphone processing list corresponding to the command (voice) out of the macro-execution list 52 (Step E19) and sends command sequence data on the smartphone processing list to the smartphone 12 (Step E20). As described above, after receiving the command sequence data, the smartphone 12 starts target application software and executes predetermined processing (see Step D19 to D21 in FIG. 12).

More specifically, when a user has input his/her voice "I am coming home now, Smartphone" into the wrist terminal 11, the wrist terminal server 15 receives the input voice of the user via the smartphone 12. Further, the wrist terminal server 15 reads command sequence data corresponding to the voice from the macro-execution list 52 shown in FIG. 10, and instructs the smartphone 12 to start the applications software for the system and electronic mails and send a message that "I have just left the office" to the address of "Yamada Hanako".

Figure 14:
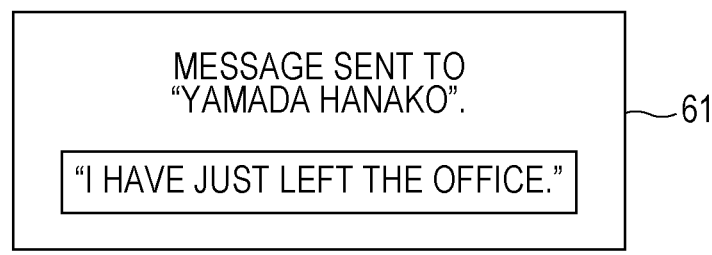
FIG. 14 is a drawing illustrating an example of a success report displayed on the wrist terminal according to the first embodiment.
Figure 15:
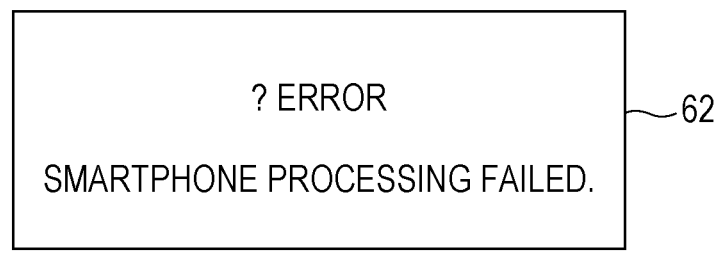
FIG. 15 is a drawing illustrating an example of an error message displayed on the wrist terminal according to the first embodiment.

If the smartphone 12 has succeeded in sending the electronic mail, the wrist terminal 11 receives a success report 61 as shown in FIG. 14 and the display section 22 of the wrist terminal 11 displays the success report 61 (see Step C18 in FIG. 11). On the other hand, if the smartphone 12 has failed in sending the electronic mail, the wrist terminal 11 receives an error message 62 as shown in FIG. 15 and the display section 22 of the wrist terminal 11 displays the error message (see Step C19 in FIG. 11).

As is seen from the above descriptions, all that a user has to do in order to remote-control the smartphone 12 so that predetermined processing can be executed is to input voice of the user into the wrist terminal 11. In other words, all that a user has to do in order to adequately use various functions of the smartphone 12 is to say the words aloud that the user has set in advance, and the user does not have to do complicated operations to the smartphone 12 or bother to take the smartphone 12 off the clothes or out of the bag of the user.

Second Embodiment

Next, a second embodiment of the present invention will be described.

Although the smartphone 12 is remote-controlled based on the voice that the user has input into the wrist terminal 11 in the first embodiment, the remote-control is exercised based on the actions of the user that the wrist terminal 11 has detected in the second embodiment.

The sensor section 26 of the wrist terminal 11 includes motion detection sensors such as an acceleration sensor and a gyroscope. The motion detection sensors output signals, from which what a user is doing can be inferred (for example, the user is walking, or running, or travelling by car).

FIG. 16 is a drawing illustrating a configuration of a command registration screen 71 according to the second embodiment of the present invention.

In the second embodiment, commands are newly registered using the command registration screen 71 as shown in FIG. 16. On the command registration screen 71, an action registration button 72 is provided for registering actions of a user. When the action registration button 72 is pressed, selection items 73 of "walking", "running", and "bicycle or car" are displayed and the user can select any action.

Further, reference numbers 74 and 75 in the drawing denote app selection buttons. Applications and processing contents are registered by pressing the app selection buttons 74 and 75. In the example of FIG. 16, with the app selection button 74, "System" Application Software is registered and the execution of "sleep restoration" is registered as the processing contents. On the other hand, with the app selection button 75, "Walking Record" Application Software is registered and the recording of the tracks of walking with GPS by walking, for example, is registered as the processing contents.

The actions, applications, and processing contents set on the command registration screen 71 form macro-execution data. The macro-execution data, the wrist terminal ID, and the user ID are managed on a user to user basis in the server memory 51 shown in FIG. 9.

FIG. 17 is a drawing illustrating an example of a macro-execution list 81, which is a list of the macro-execution data.

In this example, "walking" is registered as an action of a user, and the procedures are registered of starting "System" and "Walking Record" Applications of the smartphone 12 at the detection of walking and executing processing regarding walking.

Subsequently, the operations according to the second embodiment will be described by dividing the operations into the operations at the times of (a) command registration and (b) application software execution.

(a) Operations at the Time of Command Registration

Figure 18:
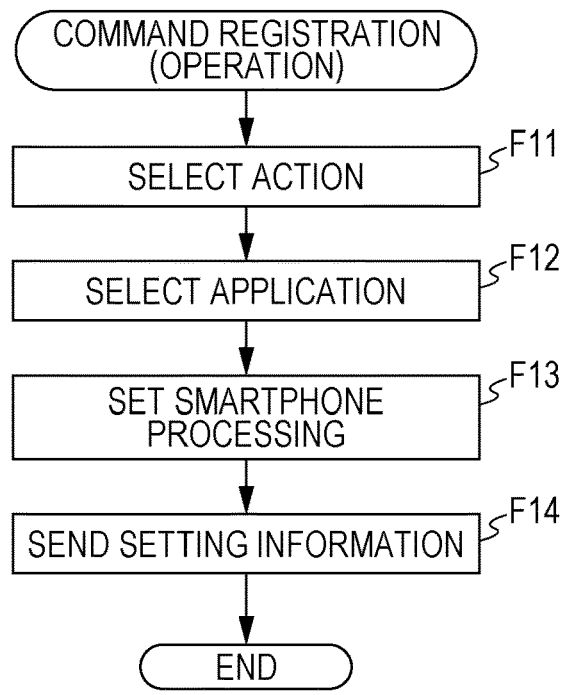
FIG. 18 is a flowchart illustrating processing operations at the time of command registration conducted by a smartphone according to the second embodiment.

FIG. 18 is a flowchart illustrating processing operations at the time of command registration conducted by the smartphone 12 according to the system. The processing shown in the flowchart is executed in a manner that the CPU 31 installed in the smartphone 12 reads the program 35a stored in the memory 35.

The "command registration" means doing settings for allowing the smartphone 12 to execute applications, and more specifically means adequately setting an action as a trigger of execution of application software, an application to be executed, and processing contents via the command registration screen 71 shown in FIG. 16. The command registration screen 71 is provided by the wrist terminal server 15 and can be obtained via Web application software as in the first embodiment.

First, a user selects an action which is a trigger of execution of application software via the command registration screen 71 by predetermined operations (Step F11). More specifically, the user presses the action registration button 72 on the command registration screen 71 and freely selects an action from the selection items 73. In the example of FIG. 16, the user has selected "walking" from "walking", "running", and "bicycle or car".

Thereafter, the user sets an application and smartphone processing by predetermined operations (Step F12 and F13). Specifically, the user inputs an application and processing contents by pressing the app selection buttons 44 and 45 on the command registration screen 41.

In the example of FIG. 16, with the app selection button 74, "System" Application Software is registered and "sleep restoration" is registered as the processing contents. Furthermore, with the app selection button 75, "Walking Record" Application Software is registered and GPS log record obtained by walking is registered as the processing contents.

When the action, the applications, and the processing contents have been set on the command registration screen 71, the smartphone 12 (specifically CPU 31) adds a wrist terminal ID and a user ID to the setting information and sends all of the IDs and the information to the wrist terminal server 15 (Step F14).

As shown in FIG. 9, the wrist terminal server 15 includes the server memory 51 with a large capacity. The server memory 51 stores a wrist terminal ID, a user ID, and macro-execution data based on the setting information for each user. The "macro-execution data" is data for allowing the smartphone 12 to execute applications, and is formed of the action, the applications, and the processing contents set on the command registration screen 71 in the second embodiment. FIG. 17 illustrates an example of a list of the macro-execution data.

Note that the setting information on the actions of the user which have been set on the command registration screen 71 is supposed to be sent to the wrist terminal 11 as well. The wrist terminal 11 stores the setting information of the actions in a predetermined area of the memory 25, and sends the setting information to the smartphone 12 when any of the actions is detected.

(b) Operations at the Time of Execution of Application Software

As shown in FIG. 2, a user of the system is always wearing the wrist terminal 11 on a wrist. The smartphone 12 is supposed to be within a range where short-distance wireless communication is possible between the smartphone 12 and the wrist terminal 11 (on the clothes or in the bag of the user, for example).

(Processing by the Wrist Terminal)

Figure 19:
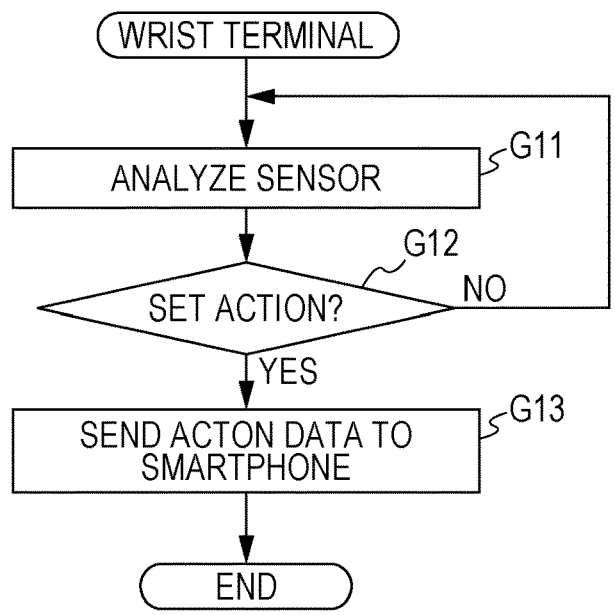
FIG. 19 is a flowchart illustrating processing at the time of execution of application software conducted by a wrist terminal according to the second embodiment.

FIG. 19 is a flowchart illustrating processing at the time of execution of application software conducted by the wrist terminal 11 according to the system. The processing shown in the flowchart is executed in a manner that the CPU 21 installed in the wrist terminal 11 reads the program 25*a* stored in the memory 25.

The sensor section 26 of the wrist terminal 11 has motion detection sensors including an acceleration sensor and a gyroscope. The motion detection sensors detect the motions of the wrist terminal 11 as the actions of the user. The wrist terminal 11 (specifically CPU 21) analyzes the signals of the motion detection sensors (Step G12) and judges the activity state of the user based on the results of the analysis (Step G12).

Examples of the "activity state of the user" include states of walking, running, and travelling by car, for example, of the user. If the data that the motion detection sensors output based on actual motions of the user in his/her daily life is related in advance to the respective actions of the user corresponding to the motions, the current activity state of the user can be precisely determined. Further, more precise determination of the current activity state is possible if the position information detected by the GPS section 28 is taken into consideration.

If the motion detection sensors have detected a predetermined action (an action set on the command registration screen 71) ("Yes" in Step G12), the wrist terminal 11 sends to the smartphone 12 action data indicating that the action has been detected (Step G13).

(Processing by the Smartphone)

Figure 20:
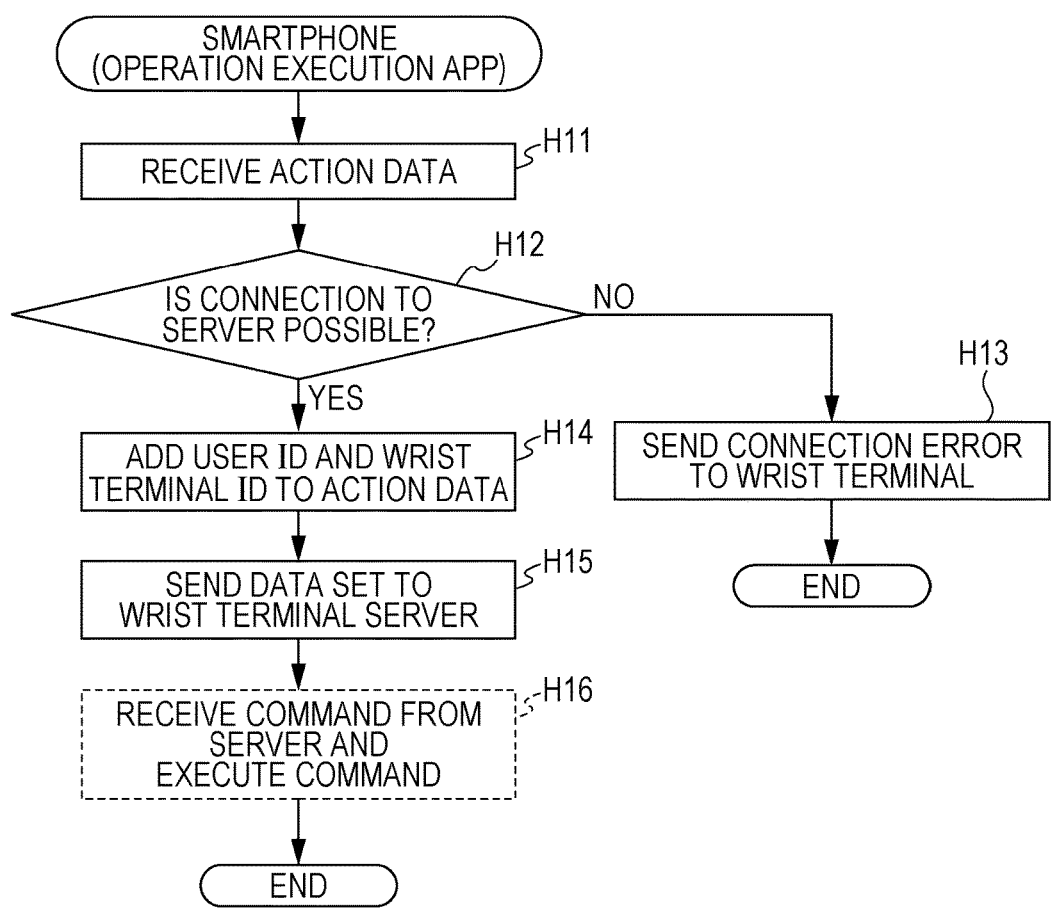
FIG. 20 is a flowchart illustrating processing at the time of execution of application software conducted by the smartphone according to the second embodiment.

FIG. 20 is a flowchart illustrating processing at the time of execution of application software conducted by the smartphone 12 according to the system. The processing shown in the flowchart is executed in a manner that the CPU 31 installed in the smartphone 12 reads the program 35*a* stored in the memory 35.

In Step G13 of FIG. 19, if the wrist terminal 11 sends action data of a user to the smartphone 12, the smartphone 12 (specifically CPU 31) receives the action data (Step H11) and determines whether a connection is possible between the smartphone 12 and the wrist terminal server 15 on the network 13 (Step H12).

As a means for connecting to the wrist terminal server 15 on the network 13, wireless LAN (Wi-Fi) or a 3G cellular phone network, for example, is used. If a connection is impossible to the wrist terminal server 15 using the connection means ("No" in Step H12), the smartphone 12 notifies the wrist terminal 11 of a connection error (Step H13). Upon receipt of the notification of the connection error, the wrist terminal 11 displays a message indicative of the connection error on the display section 22 (see Step C19 in FIG. 11).

If a connection is possible to the wrist terminal server 15 ("Yes" in Step H12), the smartphone 12 adds a wrist terminal ID and a user ID to the action data of the user and sends all of the IDs and the data to the wrist terminal server 15 (Step H14 and H15).

If the wrist terminal server 15 responds to the transmission of the data set and the response is an error notification, the smartphone 12 sends the contents of the error notification to the wrist terminal 11. Upon receipt of the contents of the error notification, the wrist terminal 11 displays a message indicative of the contents on the display section 22 (see Step C19 in FIG. 11).

If the response is not an error notification, the smartphone 12 receives command sequence data sent from the wrist terminal server 15, starts target application software based on the command sequence data, and executes predetermined processing (Step H16).

In the example of FIG. 17, if the wrist terminal 11 has detected the "walking" action of a user, the wrist terminal server 15 sends as the command sequence data processing of starting "System" and "Walking Record" Applications Software and initiating GPS log recording. Upon receipt of the command sequence data, the smartphone 12 starts "System" and "Walking Record" Applications Software and starts GPS log recording in accordance with the command sequence data.

The processing by the wrist terminal server 15 is similar to those in the first embodiment and the detailed description thereof will be thus omitted. It is to be noted that the trigger of executing the applications software is not "voice" but "action" and that the processing in Steps E15 and E16 shown in FIG. 13 is unnecessary in the second embodiment.

In this way, it is possible to execute predetermined processing by remote-controlling the smartphone 12 with the action of a user that the wrist terminal 11 has detected as a trigger. Hence, all that a user has to do in order to adequately use various functions of the smartphone 12 is to do the action that the user has set in advance, and the user does not have to do complicated operations to the smartphone 12 or bother to take the smartphone 12 off the clothes or out of the bag of the user as in the first embodiment.

Examples of actions of a user may include coming to a place where the user has set on a map in advance and leaving the place, and the user may start the smartphone 12 to execute predetermined processing when any of the actions is taken. The current position of a user can be detected by the GPS section 28 installed in the wrist terminal 11. With the GPS section 28, when a user arrives the place where the user has specified on a map in advance, the wrist terminal 11 notifies the smartphone 12 of the arrival of the user, the smartphone 12 notifies the wrist terminal server 15 of the place as previously described, and the wrist terminal server 15 issues an command based on which an electronic mail saying "I am coming home in 30 minutes", for example, will be automatically sent.

As described above, according to the embodiment, a user can easily start the smartphone 12 and use various functions (applications software) only by inputting predetermined voice or making a predetermined action using the wrist terminal 11 without the need of taking the smartphone 12 every time the user wants to use it and doing complicated operations to the smartphone 12.

Further, since the wrist terminal 11 is in the shape of a watch so that a user can be always wearing it, the user can start the smartphone 12 at any time.

Note that although the first and the second embodiments have been described with the smartphone 12 as an example, any other mobile terminals are applicable as long as the mobile terminals are equipped with a function of accessing the wrist terminal server 15.

In essence, while the present invention has been described with reference to some embodiments, it is to be understood that these embodiments are only exemplary and are not intended to limit the scope of the invention. It is also to be understood that the new embodiments can be reduced to practice in other different modes and that various omissions, replacements, and alterations may occur insofar as they are within the scope of the invention. The embodiments and modified examples thereof are within the scope and the gist of the invention as well as within the scope of the invention disclosed in the appended claims and the equivalents thereof.

What is claimed is:

1. A terminal control system, comprising:
    a first terminal;
    a second terminal connected to the first terminal by short-distance wireless communication; and
    a server on a network connected to the second terminal via a communication link,
    wherein the server includes a processor configured to:
        store a plurality of sets of processing command sequences to be executed by the second terminal, wherein each processing command sequence is associated with user's action information and respective terminal identification information; and
        in response to receiving user's action information and terminal identification information of the first terminal from the second terminal, sending, to the second terminal, a specified processing command sequence of a predetermined set that is to be executed by the second terminal and that is associated with the user's action information and the terminal identification information of the first terminal, from among the plurality of sets of processing command sequences, and
    wherein the second terminal executes the specified processing command sequence sent thereto.

2. The terminal control system according to claim 1, wherein the processor is further configured to:
    store the plurality of sets of processing command sequences to be executed by the second terminal such that each processing command sequence is associated with respective predetermined information to be detected by the first terminal, the predetermined information including the user's action information, and such that each of the plurality of sets is associated with respective terminal identification information to be provided by the second terminal; and
    in response to receiving, from the second terminal, (i) predetermined information detected by the first terminal and (ii) terminal identification information provided by the second terminal, sending, to the second terminal, a specified processing command sequence of a predetermined set that is to be executed by the second terminal and that is associated with (i) the predetermined information and (ii) the terminal identification information, from among the plurality of sets of processing command sequences, and
    wherein the second terminal executes the specified processing command sequence sent thereto.

3. The terminal control system according to claim 2, wherein the processor is further configured to:
    select the predetermined set from among the plurality of sets of processing command sequences that is associated with the user's action information and the terminal identification information; and
    after selecting the predetermined set, sending, to the second terminal, the specified processing command sequence in accordance with the predetermined set which has been selected, and
    wherein the second terminal executes the specified processing command sequence sent thereto.

4. The terminal control system according to claim 2, wherein:
    the first terminal has a voice input function which is capable of receiving a predetermined voice to be inputted by a user, the predetermined information further including the predetermined voice, and
    the processor receives, via the second terminal, the predetermined voice inputted into the first terminal with the voice input function, and then sends the specified processing command sequence to the second terminal based on the predetermined voice inputted into the first terminal with the voice input function, and
    wherein the second terminal executes the specified processing command sequence sent thereto.

5. The terminal control system according to claim 2, wherein:
the first terminal has a motion detecting function which is capable of detecting a predetermined action of a user as the user's action information, and
the processor receives, via the second terminal, the predetermined action detected by the first terminal with the motion detecting function, and then sends the specified processing command sequence to the second terminal based on the predetermined action detected by the first terminal with the motion detecting function, and
wherein the second terminal executes the specified processing command sequence sent thereto.

6. The terminal control system according to claim 5, wherein:
the first terminal has a position detecting function which is capable of detecting a current position of the user as the predetermined action, and
the processor receives, via the second terminal, the current position of the user detected by the first terminal with the position detecting function as the predetermined action, and then sends the specified processing command sequence to the second terminal based on the current position of the user detected by the first terminal with the position detecting function as the predetermined action, and
wherein the second terminal executes the specified processing command sequence sent thereto.

7. The terminal control system according to claim 2, wherein the second terminal associates the predetermined information with the terminal identification information when the first terminal detects the predetermined information.

8. The terminal control system according to claim 2, wherein the processor is further configured to judge whether the predetermined information detected by the first terminal is registered or not, and
wherein the processor sends, to the second terminal, the specified processing command sequence of the predetermined set based on the detected predetermined information when it is judged that the predetermined information is registered.

9. The terminal control system according to claim 2, wherein the processor sends, to the second terminal, the specified processing command sequence of the predetermined set based on the detected predetermined information related to the predetermined set when the processor receives the predetermined information and the terminal identification information from the first terminal via the second terminal.

10. The terminal control system according to claim 1, wherein the first terminal has a shape such that a user can wear the first terminal.

11. A method performed by a system including a first terminal, a second terminal connected to the first terminal by short-distance wireless communication, and a server connected to the second terminal via a communication link, the server controlling the second terminal, and the method comprising:
storing, into a memory of the server, a plurality of sets of processing command sequences to be executed by the second terminal, wherein each processing command sequence is associated with user's action information and respective terminal identification information;
in response to the server receiving user's action information and terminal identification information of the first terminal from the second terminal, sending, from the server to the second terminal, a specified processing command sequence of a predetermined set that is to be executed by the second terminal and that is associated with the user's action information and the terminal identification information of the first terminal, from among the plurality of sets of processing command sequences; and
executing, by the second terminal, the specified processing command sequence sent thereto.

12. The method according to claim 11, wherein the storing stores the plurality of sets of processing command sequences to be executed by the second terminal such that each processing command sequence is associated with respective predetermined information to be detected by the first terminal, the predetermined information including the user's action information, and such that each of the plurality of sets is associated with respective terminal identification information to be provided by the second terminal; and
wherein the method further comprises, in response to receiving, from the second terminal, (i) predetermined information detected by the first terminal and (ii) terminal identification information provided by the second terminal:
sending, from the server to the second terminal, a specified processing command sequence of a predetermined set that is to be executed by the second terminal and that is associated with (i) the predetermined information and (ii) the terminal identification information, from among the plurality of sets of processing command sequences, and
executing, by the second terminal, the specified processing command sequence sent thereto.

13. The method according to claim 11, wherein:
the first terminal has a voice input function which is capable of receiving a predetermined voice to be inputted by a user, the predetermined information further including the predetermined voice, and
the method further comprises:
receiving, via the second terminal, the predetermined voice inputted into the first terminal with the voice input function, and then sending the specified processing command sequence to the second terminal based on the predetermined voice inputted into the first terminal with the voice input function; and
executing, by the second terminal, the specified processing command sequence sent thereto.

* * * * *